(12) United States Patent
Freund et al.

(10) Patent No.: US 12,195,703 B2
(45) Date of Patent: *Jan. 14, 2025

(54) COMPOSITION COMPRISING HUEING AGENT

(71) Applicant: Milliken & Company, Spartanburg, SC (US)

(72) Inventors: Wesley A. Freund, Simpsonville, SC (US); Richard Lawson, Greer, SC (US); Sanjeev K. Dey, Spartanburg, SC (US); Nolan Peevy, Roebuck, SC (US)

(73) Assignee: Milliken & Company, Spartanburg, SC (US)

( * ) Notice: Subject to any disclaimer, the term of this patent is extended or adjusted under 35 U.S.C. 154(b) by 308 days.

This patent is subject to a terminal disclaimer.

(21) Appl. No.: 17/156,771

(22) Filed: Jan. 25, 2021

(65) Prior Publication Data

US 2021/0269747 A1    Sep. 2, 2021

Related U.S. Application Data

(60) Provisional application No. 62/983,872, filed on Mar. 2, 2020.

(51) Int. Cl.
| | | |
|---|---|---|
| C11D 3/40 | (2006.01) | |
| C09B 29/01 | (2006.01) | |
| C11D 3/34 | (2006.01) | |
| C11D 3/42 | (2006.01) | |
| C11D 17/04 | (2006.01) | |
| D06M 15/63 | (2006.01) | |
| C09B 29/033 | (2006.01) | |
| C09B 43/00 | (2006.01) | |

(52) U.S. Cl.
CPC .......... *C11D 3/349* (2013.01); *C09B 29/0007* (2013.01); *C11D 3/42* (2013.01); *C09B 29/0059* (2013.01); *C09B 43/00* (2013.01); *C11D 17/043* (2013.01); *C11D 17/045* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 3,755,201 | A | 8/1973 | Trimmer |
| 4,264,495 | A | 4/1981 | Maher |
| 4,507,407 | A | 3/1985 | Kluger |
| 4,775,748 | A | 10/1988 | Kluger |
| 4,912,203 | A | 3/1990 | Kluger |
| 5,728,671 | A | 3/1998 | Rohrbaugh |
| 5,747,440 | A | 5/1998 | Kellett |
| 5,929,010 | A | 7/1999 | Kellett |
| 6,306,812 | B1 | 10/2001 | Perkins |
| 11,718,814 | B2 * | 8/2023 | Freund ................. D06L 4/614 |
| | | | 510/296 |
| 2003/0212172 | A1 | 11/2003 | Danielson |
| 2005/0113267 | A1 | 5/2005 | Popplewell |
| 2008/0177089 | A1 | 7/2008 | Sadlowski |
| 2008/0177090 | A1 | 7/2008 | Valenti |
| 2009/0223003 | A1 | 9/2009 | Batchelor |
| 2009/0286709 | A1 | 11/2009 | Sadlowski |
| 2012/0117736 | A1 * | 5/2012 | Miracle ............... C11D 3/43 |
| | | | 510/516 |
| 2012/0123101 | A1 | 5/2012 | Torres |
| 2012/0309945 | A1 | 12/2012 | Torres |
| 2014/0187463 | A1 | 7/2014 | Sadlowski |
| 2015/0080561 | A1 | 3/2015 | Torres |
| 2015/0232789 | A1 | 8/2015 | Torres |
| 2017/0101536 | A1 | 4/2017 | Torres |
| 2019/0177546 | A1 | 6/2019 | Qin |
| 2020/0080030 | A1 | 3/2020 | Sadlowski |
| 2020/0216676 | A1 | 7/2020 | Torres |
| 2021/0269747 | A1 | 9/2021 | Freund |

FOREIGN PATENT DOCUMENTS

| | | |
|---|---|---|
| CN | 104053727 | 9/2014 |
| CN | 105934508 | 9/2016 |
| CN | 107001994 | 8/2017 |
| EP | 2992054 B1 | 1/2017 |
| JP | 2014500350 A | 1/2014 |
| JP | 2014501802 | 1/2014 |
| JP | 2014520177 | 8/2014 |
| JP | 2015500888 | 1/2015 |
| WO | 2008087497 A1 | 7/2008 |
| WO | 2008091524 A1 | 7/2008 |
| WO | 2011011799 A2 | 1/2011 |
| WO | 2011017719 A2 | 2/2011 |
| WO | 2012166584 A1 | 12/2012 |
| WO | 2014177369 A1 | 11/2014 |
| WO | 2016081437 A1 | 5/2016 |
| WO | 2019075142 A1 | 4/2019 |

OTHER PUBLICATIONS

International Search Report and Written Opinion for App. No. PCT/US2021/016541, dated Jun. 22, 2021, 12 pages.
Balicki Roman et al., "Mild and efficient conversion of nitriles to amides with basic urea-hydrogen peroxide adduct", Synthetic Communications, vol. 23, No. 22, Dec. 1, 1993, pp. 3149-3155, XP055813486, US, ISSN: 0039-7911, DOI: 10.1080/00397919308011173.
International Preliminary Report on Patentability issued in App. No. PCT/US2021/016541, dated Sep. 6, 2022, 9 pages.
International Preliminary Report on Patentability issued in App. No. PCT/US2021/016543, Sep. 6, 2022, 10 pages.
International Preliminary Report on Patentability issued in App. No. PCT/US2021/016544, dated Sep. 6, 2022, 10 pages.

(Continued)

*Primary Examiner* — Lorna M Douyon

(74) *Attorney, Agent, or Firm* — Brenda D. Amidon

(57) ABSTRACT

This invention relates to a laundry care composition comprising a laundry care ingredient and a polymeric thiophene hueing agent.

12 Claims, No Drawings

(56) References Cited

OTHER PUBLICATIONS

International Search Report and Written Opinion for App. No. PCT/US2021/016543, dated May 10, 2021, 11 pages.
International Search Report and Written Opinion for App. No. PCT/US2021/016544, dated May 12, 2021, 12 pages.

\* cited by examiner

COMPOSITION COMPRISING HUEING AGENT

CROSS REFERENCE TO RELATED APPLICATIONS

This application claims priority to U.S. Provisional Patent Application No. 62/983,872, entitled "Composition Comprising Hueing Agent," which was filed on Mar. 2, 2020, and is entirely incorporated by reference herein.

TECHNICAL FIELD

This invention relates to a laundry care composition comprising a laundry care ingredient and a polymeric thiophene hueing agent.

BACKGROUND

As consumers move toward lower temperature and shorter washing cycles for laundry to conserve energy, the cleaning efficiency of laundry care compositions may not be as effective as at higher temperatures and longer wash times. Therefore, the use of hueing agents in laundry care compositions provides a technology that offers a whitening benefit to dingy textile articles (e.g. clothing and other garments), making them appear brighter and whiter, even at low wash temperatures and short cycle times. The use of harsh bleaching chemicals is also not desired as they can shorten the life cycle of the textile articles and be environmentally unfriendly. Furthermore, in some instances, consumers prefer a more reddish-violet shade hue on clothes when masking the yellowing of fabrics which cannot be obtained with bleach formulations. As a result, there is a continued need to improve the whitening effect of textile articles treated with laundry care compositions that contain hueing agents. The present invention provides a laundry care composition comprising a polymeric thiophene hueing agent which has been demonstrated to whiten textile articles, such as cellulose-containing fabrics. Incorporating this hueing agent in a laundry care composition provides one possible and successful delivery mechanism for deposition onto a textile substrate. Each time the textile substrate is washed, the hueing agent is deposited on the textile substrate. Thus, the textile substrate is continually whitened, and the life cycle of the article may be extended.

BRIEF SUMMARY

In one aspect, the invention relates to an aqueous laundry care composition comprising a laundry care ingredient and from 0.0001 wt % to 1.0 wt % of a polymeric thiophene hueing agent having the structure of Formula I:

Formula I

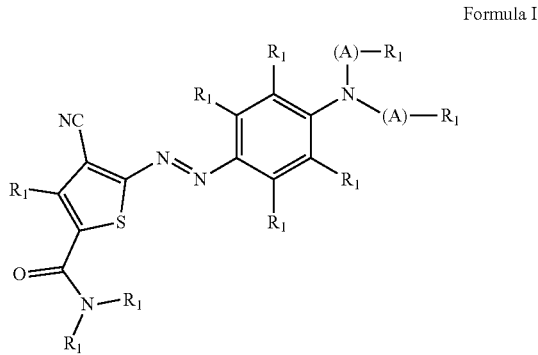

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, $-COR_2$, $-CH_2COH$, $-COOR_2$, $-COOH$, $-SO_3H$, $-CH_2COOH$, $-CH_2CH_2Cl$, $-CH=CH_2$, $-CH_2CH(OH)_2$, and salts thereof; wherein each $R_2$ is independently selected from $C_{1-18}$ alkyl, aryl, substituted aryl, and substituted alkyl.

In another aspect, the invention relates to an aqueous laundry care composition comprising a laundry care ingredient and from 0.0001 wt % to 1.0 wt % of a polymeric thiophene hueing agent having the structure of Formula I:

wherein each A is independently selected from the group consisting of polyethyleneoxy, polypropyleneoxy, and polyethyleneoxy/polypropyleneoxy copolymers, and wherein each A is independently present in the range from 1 to 5 polyethyleneoxy, polypropyleneoxy or polyethyleneoxy/polypropyleneoxy copolymers repeating units; wherein each $R_1$ is independently selected from H, and $C_{1-4}$ alkyl.

In a further aspect, the invention relates to an aqueous laundry care composition comprising a laundry care ingredient and from 0.0001 wt % to 1.0 wt % of a polymeric thiophene hueing agent having the structure of Formula II:

Formula II

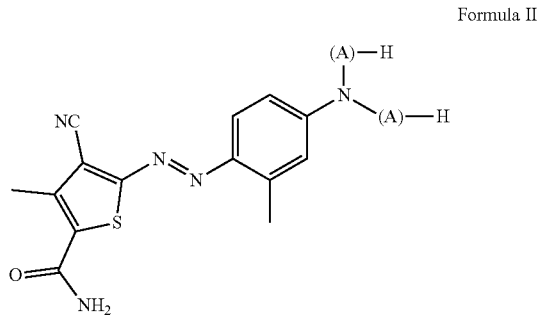

wherein each A is independently selected from the group consisting of polyethyleneoxy, polypropyleneoxy, and polyethyleneoxy/polypropyleneoxy copolymers, and wherein each A is independently present in the range from 1 to 5 polyethyleneoxy, polypropyleneoxy or polyethyleneoxy/polypropyleneoxy copolymers repeating units.

In yet a further aspect, the invention relates to a method for making an amide-containing, polymeric thiophene hueing agent, wherein the amide is formed via hydrolysis of a nitrile under basic conditions, such as pH >9.

In another aspect, the invention relates to a laundry care composition comprising: (1) a laundry care ingredient; (2) from 0.0001 wt % to 1.0 wt % of a polymeric thiophene hueing agent having the structure of Formula I:

Formula I

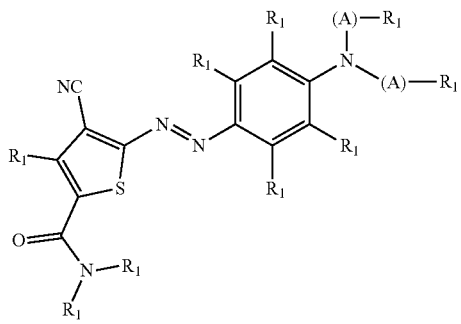

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —$CH=CH_2$, —$CH_2CH(OH)_2$, and salts thereof; wherein each $R_2$ is independently selected from $C_{1-18}$ alkyl, aryl, substituted aryl, and substituted alkyl; and (3) from 0.0001 wt % to 1.0 wt % of a polymeric thiophene hueing agent having the structure of Formula X:

Formula X

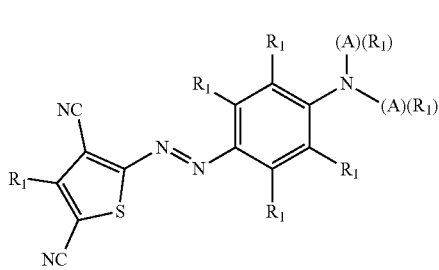

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —$CH=CH_2$, —$CH_2CH(OH)_2$, and salts thereof; wherein each $R_2$ is independently selected from $C_{1-18}$ alkyl, aryl, substituted aryl, and substituted alkyl.

In a further aspect, the invention relates to a laundry care composition comprising: (i) a laundry care ingredient; and (ii) from 0.0001 wt % to 1.0 wt % of a polymeric thiophene hueing agent having the structure of Formula I:

Formula I

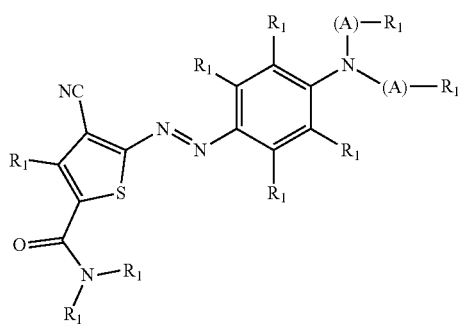

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —$CH=CH_2$, —$CH_2CH(OH)_2$, and salts thereof; wherein each $R_2$ is independently selected from $C_{1-18}$ alkyl, aryl, substituted aryl, and substituted alkyl; and wherein the laundry care composition imparts a whitening effect to a cellulose-containing textile article that is measurably greater than a polyester-containing textile article treated with the laundry care composition, wherein the whitening effect is measured via a whiteness index on each textile article.

In another aspect, the invention relates to a process for measurably improving a whitening effect on cellulose-containing textile articles, wherein the improvement is present in an amount that is greater than the amount observed on polyester-containing textile articles, wherein the process comprises the following steps: (a) providing a cellulose-containing textile substrate, (b) providing a polyester-containing textile substrate, (c) exposing the textile substrates of steps (a) and (b) to a laundry care composition comprised of: (i) a laundry care ingredient; and (ii) from 0.0001 wt % to 1.0 wt % of a polymeric thiophene hueing agent having the structure of Formula I:

Formula I

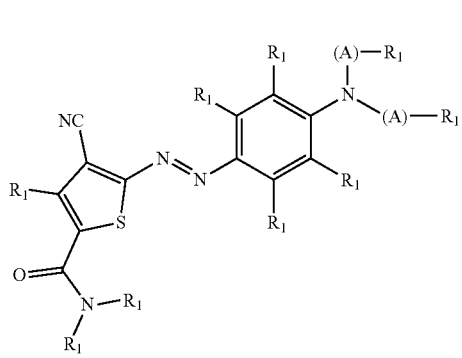

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —$CH=CH_2$, —$CH_2CH(OH)_2$, and salts thereof; wherein each $R_2$ is independently selected from $C_{1-18}$ alkyl, aryl, substituted aryl, and substituted alkyl; and (d) measuring the whitening effect via evaluation of the whiteness index of each textile article.

In another aspect, the invention relates to a textile article, wherein the textile article contains: (a) a majority by weight of cellulose fiber, and (b) a laundry care composition comprising: (i) a laundry care ingredient; and (ii) from 0.0001 wt % to 1.0 wt % of a polymeric thiophene hueing agent having the structure of Formula III:

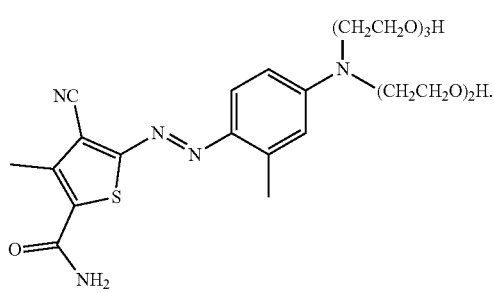

Formula III

DETAILED DESCRIPTION

The invention described herein is laundry care composition comprising a laundry care ingredient and a polymeric thiophene hueing agent. In one aspect of the invention, the polymeric thiophene hueing agent is added to a textile article via a laundry care composition during a standard laundering process. The laundry care composition that contains the polymeric thiophene hueing agent is added to a washing machine, thereby allowing the molecule to come into direct contact with the textile article. Thus, during the laundry process, the polymeric thiophene hueing agent is deposited onto at least one surface of the textile article and improvement in whitening of the treated textile article is achieved.

As used herein, the term "alkoxy" is intended to include $C_1$-$C_8$ alkoxy and alkoxy derivatives of polyols having repeating units such as butylene oxide, glycidol oxide, ethylene oxide or propylene oxide.

As used herein, unless otherwise specified, the terms "alkyl" and "alkyl capped" are intended to include $C_2$ to $C_{100}$ alkyl groups, $C_2$ to $C_{50}$ alkyl groups, $C_5$-$C_{25}$ alkyl groups, or even $C_{10}$-$C_{20}$ alkyl groups.

As used herein, unless otherwise specified, the term "aryl" is intended to include $C_6$-$C_{12}$ aryl groups.

As used herein, unless otherwise specified, the term "arylalkyl" is intended to include $C_1$-$C_{18}$ alkyl groups and, in one aspect, $C_1$-$C_6$ alkyl groups.

As used herein, unless otherwise specified, the term "alkanoyl" refers to univalent groups of the formula —C(O)$R^a$, where $R^a$ is an alkyl group, preferably a $C_3$-$C_{29}$ alkyl group.

As used herein, unless otherwise specified, the term "alkenyl" refers to univalent groups derived from acyclic olefinic hydrocarbons by removal of a hydrogen atom from any carbon atom. In the context of this definition, the term "acyclic olefinic hydrocarbons" refers to acyclic hydrocarbons containing one or more carbon-carbon double bonds.

The terms "ethylene oxide," "propylene oxide" and "butylene oxide" may be shown herein by their typical designation of "EO," "PO" and "BO," respectively.

All percentages and ratios are calculated by weight unless otherwise indicated. All percentages and ratios are calculated based on the total composition unless otherwise indicated.

Polymeric thiophene hueing agents suitable for use in the present invention may contain various groups, such as oxyalkylated, acylated, alkylated, carbonylated, olefiniated, and the like, derivatives thereof, prepared by introducing such groups individually, alternatively, and/or in combination, including for example, derivatives prepared by varying the order of adding such groups, by increasing the number and order of adding such groups, and the like.

In one aspect, the invention is an aqueous laundry care composition comprising a laundry care ingredient and from 0.0001 wt % to 1.0 wt % of a polymeric thiophene hueing agent having the structure of Formula I:

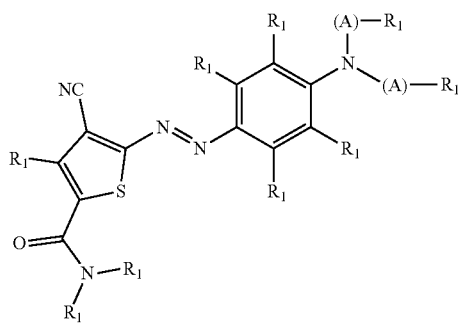

Formula I wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —$CH=CH_2$, —$CH_2CH(OH)_2$, and salts thereof; wherein each $R_2$ is independently selected from $C_{1-18}$ alkyl, aryl, substituted aryl, and substituted alkyl.

In a further aspect, the invention is an aqueous laundry care composition comprising a laundry care ingredient and from 0.0001 wt % to 1.0 wt % of a polymeric thiophene hueing agent having the structure of Formula I:

Formula I

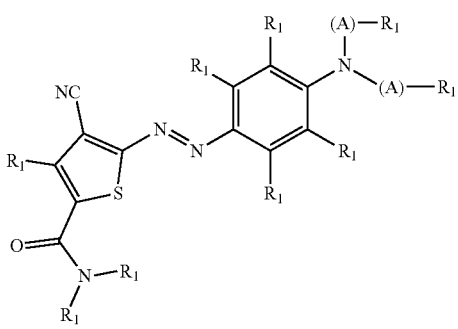

wherein each A is independently selected from the group consisting of polyethyleneoxy, polypropyleneoxy, and polyethyleneoxy/polypropyleneoxy copolymers, and wherein each A is independently present in the range from 1 to 5 polyethyleneoxy, polypropyleneoxy or polyethyleneoxy/polypropyleneoxy copolymers repeating units; wherein each $R_1$ is independently selected from H, and $C_{1-4}$ alkyl.

In yet a further aspect, the invention is an aqueous laundry care composition comprising a laundry care ingredient and from 0.0001 wt % to 1.0 wt % of a polymeric thiophene hueing agent having the structure of Formula II:

Formula II

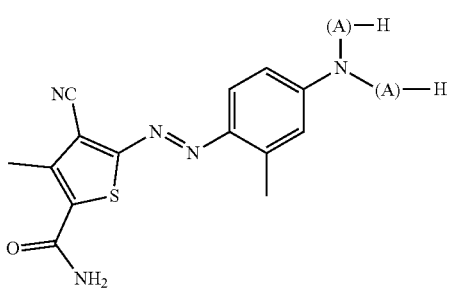

wherein each A is independently selected from the group consisting of polyethyleneoxy, polypropyleneoxy, and polyethyleneoxy/polypropyleneoxy copolymers, and wherein each A is independently present in the range from 1 to 5 polyethyleneoxy, polypropyleneoxy or polyethyleneoxy/polypropyleneoxy copolymers repeating units.

The polymeric thiophene hueing agent may be present in the laundry care composition in an amount in the range from 1 ppm to 10000 ppm, or in an amount in the range from 1 ppm to 500 ppm.

The laundry care composition may contain water in an amount in the range from 3% to 97% based on total laundry care composition weight, or in the range from 10% to 90% based on total laundry care composition weight, or even in the range from 25% to 75% based on total laundry care composition weight.

The aqueous laundry care composition of the present invention may be present in liquid form, in unit dose form, or in a multi-compartment unit dose form.

Impurities in the hueing agent may also be present. One skilled in the art would recognize that impurities related to regioisomers, incomplete reaction, or double coupling of the diazonium salt to the coupler may result when making an azo dye. Impurities may include, for example, carboxylic acids, bis-amides, regioisomeric amides or mixtures of carboxylic acids, esters, nitriles and amides present in the thiophene moiety. Thus, the aqueous laundry care composition may further contain at least one of the following structures, or salts thereof:

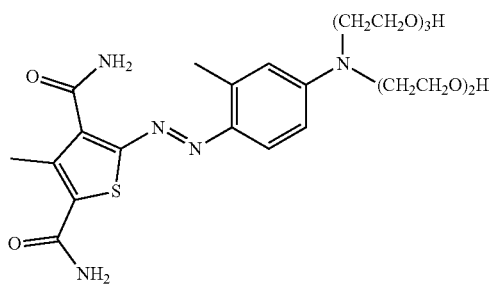

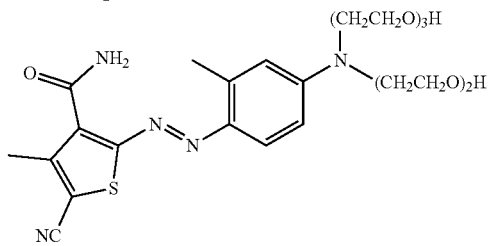

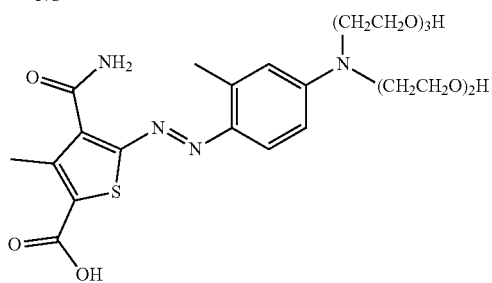

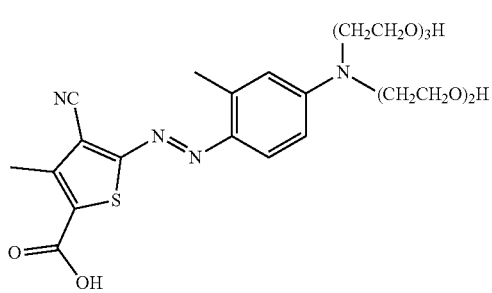

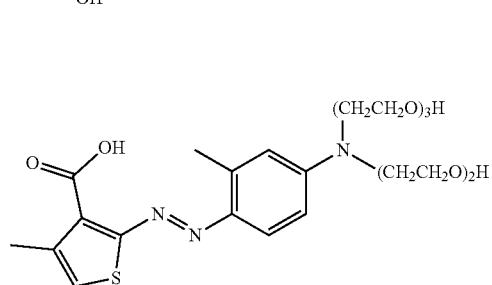

-continued

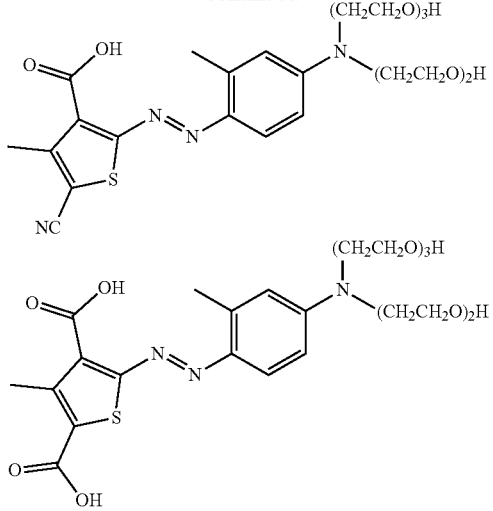

In one aspect of the invention, the aqueous laundry care composition contains a laundry care ingredient selected from the group consisting of cationic polymers, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, pigments, coloring agents, perfumes, perfume delivery systems, structure elasticizing agents, fabric softeners, carriers, hydrotropes, and processing aids.

A textile article may be treated with the laundry care composition of the present invention. As a result, the treated textile article may contain the polymeric thiophene hueing agent as described herein. In one aspect of the invention, the textile article is comprised of cellulose-containing fiber. The textile article may be in the form of a fabric. Thus, the invention includes a cellulose-containing fabric containing the polymeric thiophene hueing agent as described herein.

A method of treating a textile article to improve the visual appearance of the article includes the steps of: (1) providing a textile article, and (2) exposing the textile article to the laundry care composition containing the polymeric thiophene hueing agent as described herein. A method of treating a textile article may further comprise the steps of (i) treating a textile article with the aqueous or non-aqueous laundry care composition as described herein, and (ii) rinsing and drying the treated textile article. The method of treating a textile article with the laundry care composition of the present invention, whether aqueous or non-aqueous, may be bleach-free.

A method for making an amide-containing, polymeric thiophene hueing agent of the present invention may include forming the amide via hydrolysis of a nitrile group under basic conditions, such as conditions wherein the pH >9. Basic conditions may be formed in the presence of at least one of carbonates, bicarbonates, amines, hydroxides, alkoxides, and mixtures thereof.

The aqueous laundry care composition containing the polymeric thiophene hueing agent may impart a desired hue to a textile article with a relative hue angle >270, or a relative hue angle in the range from 270 to 310, or a relative hue angle in the range from 290 to 310.

In yet another aspect of the invention, there is a laundry care composition comprising: (1) a laundry care ingredient; (2) from 0.0001 wt % to 1.0 wt % of a polymeric thiophene hueing agent having the structure of Formula I:

Formula I

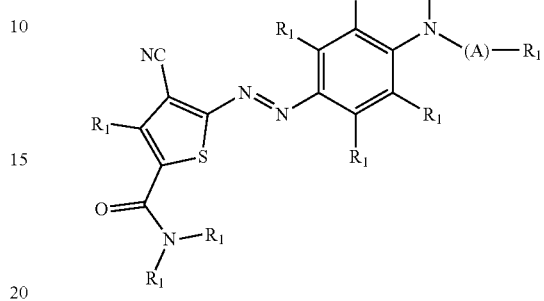

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —CH=$CH_2$, —$CH_2CH(OH)_2$, and salts thereof; wherein each $R_2$ is independently selected from $C_{1-18}$ alkyl, aryl, substituted aryl, and substituted alkyl; and (3) from 0.0001 wt % to 1.0 wt % of a polymeric thiophene hueing agent having the structure of Formula X:

Formula X

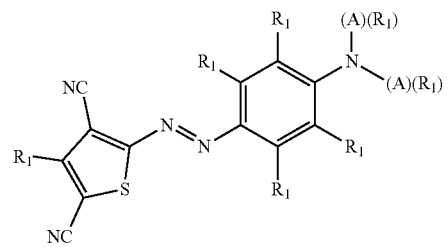

wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —CH=$CH_2$, —$CH_2CH(OH)_2$, and salts thereof; wherein each $R_2$ is independently selected from $C_{1-18}$ alkyl, aryl, substituted aryl, and substituted alkyl.

In a further aspect of the invention, there is a laundry care composition comprising: (1) a laundry care ingredient; (2) from 0.0001 wt % to 1.0 wt % of a polymeric thiophene hueing agent having the structure of Formula III:

Formula III

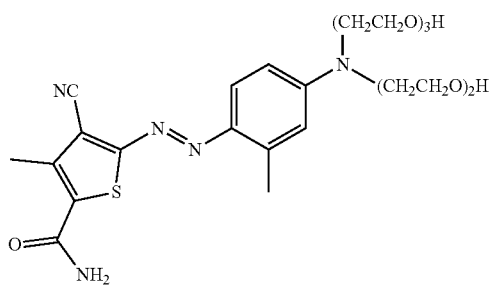

and (3) from 0.0001 wt % to 1.0 wt % of a polymeric thiophene hueing agent having the structure of Formula Y:

Formula Y

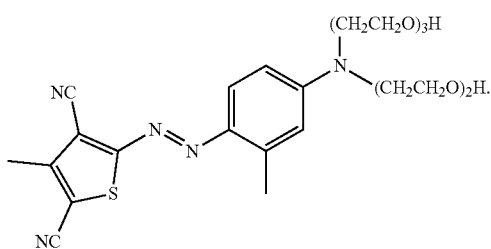

Each polymeric thiophene hueing agent is independently present in the composition in an amount in the range from 1 ppm to 10000 ppm, or even in an amount in the range from 1 ppm to 500 ppm. The polymeric thiophene hueing agents of Formula I and the polymeric thiophene hueing agent of Formula X are present in a ratio from 1:200 to 200:1, in a ratio from 1:100 to 100:1, or even in a ratio from 1:3 to 3:1. In another aspect of the invention, the polymeric thiophene hueing agents of Formula III and the polymeric thiophene hueing agent of Formula Y are present in a ratio from 1:200 to 200:1, in a ratio from 1:100 to 100:1, or even in a ratio from 1:3 to 3:1.

The laundry care composition may be present in powder form, in liquid form, in unit dose form, or in a multi-compartment unit dose form.

Impurities in the hueing agent may also be present. Impurities may include, for example, carboxylic acids, bis-amides, regioisomeric amides or mixtures of carboxylic acids, esters, nitriles and amides present in the thiophene moiety. Thus, the aqueous laundry care composition may further contain at least one of the following structures, or salts thereof:

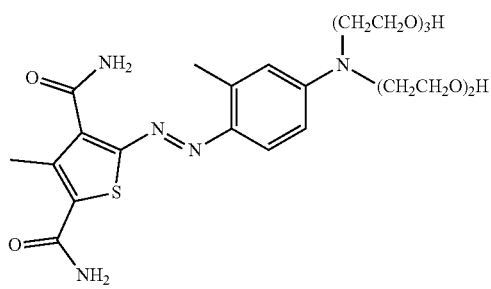

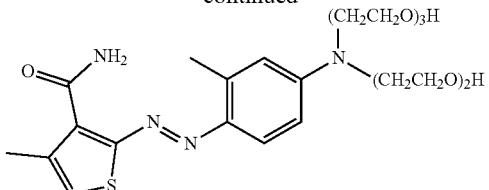

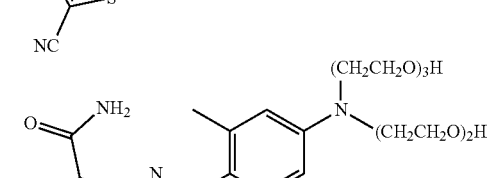

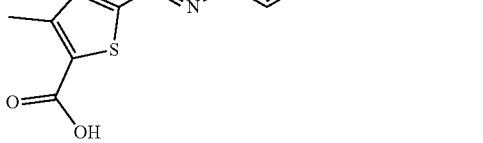

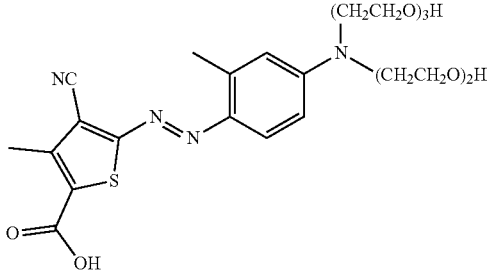

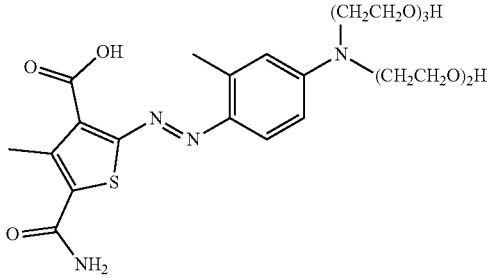

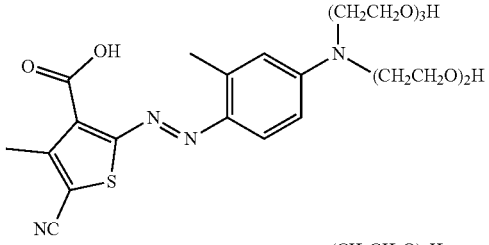

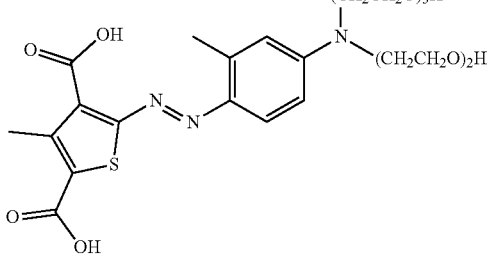

The laundry care ingredient may be selected from the group consisting of cationic polymers, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, pigments, coloring agents, perfumes, perfume delivery systems, structure elasticizing agents, fabric softeners, carriers, hydrotropes, and processing aids.

The laundry care composition may impart a desired hue to a textile article treated therewith having a relative hue angle in the range from 210 to 345, or in the range from 270 to 300.

A further aspect of the present invention includes a laundry care composition comprising: (i) a laundry care ingredient; and (ii) from 0.0001 wt % to 1.0 wt % of a polymeric thiophene hueing agent having the structure of Formula I:

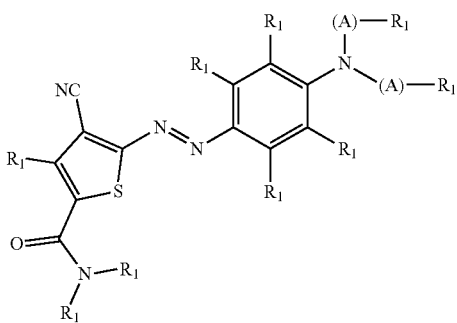

Formula I wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, —$COR_2$, —$CH_2COH$, —$COOR_2$, —COOH, —$SO_3H$, —$CH_2COOH$, —$CH_2CH_2Cl$, —CH=$CH_2$, —$CH_2CH(OH)_2$, and salts thereof; wherein each $R_2$ is independently selected from $C_{1-18}$ alkyl, aryl, substituted aryl, and substituted alkyl; and wherein the laundry care composition imparts a whitening effect to a cellulose-containing textile article that is measurably greater than a polyester-containing textile article treated with the laundry care composition, wherein the whitening effect is measured via a whiteness index on each textile article.

The polymeric thiophene hueing agent may be present in an amount in the range from 1 ppm to 10000 ppm, or in an amount in the range from 1 ppm to 500 ppm.

The cellulose-containing textile article may exhibit a whitening effect that is at least two times greater than a polyester-containing textile substrate treated with the laundry care composition. The cellulose-containing textile article may further exhibit a whitening effect that is at least five times greater than a polyester-containing textile substrate treated with the laundry care composition.

The polymeric thiophene hueing agent also provides a whitening bias on a cellulose-containing textile article when compared to a polyester-containing textile article, wherein the whitening bias is measured via the following formula: whitening bias=(change in whiteness of a cellulose-containing textile article/change in whiteness of a polyester-containing textile article), wherein the whitening effect is measured via the whiteness index of each textile article.

The cellulose-containing textile article may be comprised of fiber selected from the group consisting of cotton, linen, rayon, jute, hemp, bamboo, and blends thereof. The cellulose-containing textile article may be comprised of a majority by weight of cotton fiber. The cellulose-containing textile article may be comprised of 100% cotton fiber. The polyester-containing textile article may be comprised of a majority by weight of polyester fiber. The polyester-containing textile article may be comprised of 100% polyester fiber.

The presence of Formula I provides a hue to the cellulose-containing textile article, wherein hue is determined via measurement of relative hue angle. The cellulose-containing textile article treated with the laundry care composition of the present invention may exhibit a relative hue angle in the range from 280 to 345, or in the range from 290 to 320.

Impurities in the hueing agent may also be present. Impurities may include, for example, carboxylic acids, bisamides, regioisomeric amides or mixtures of carboxylic acids, esters, nitriles and amides present in the thiophene moiety. Thus, the aqueous laundry care composition may further contain at least one of the following structures, or salts thereof:

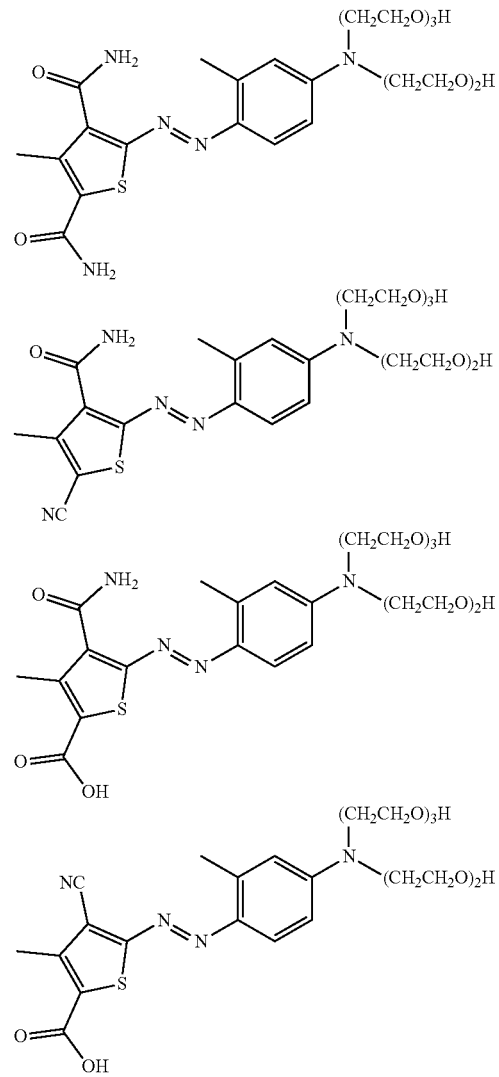

-continued

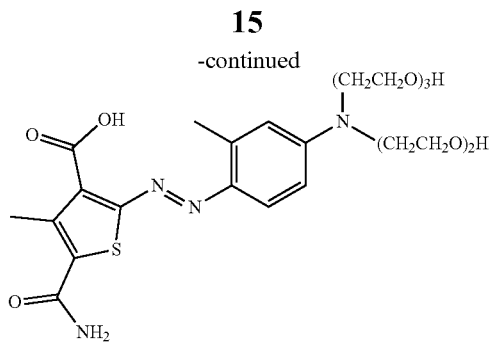

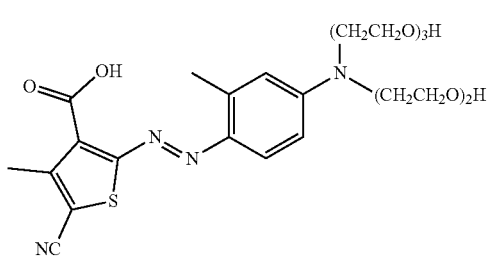

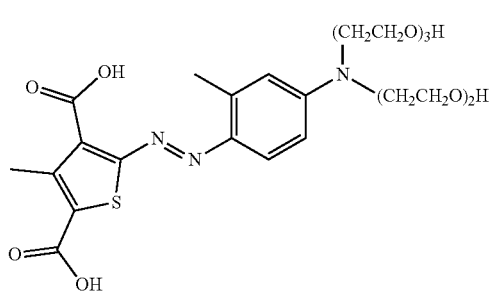

The laundry care ingredient may be selected from the group consisting of cationic polymers, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, pigments, coloring agents, perfumes, perfume delivery systems, structure elasticizing agents, fabric softeners, carriers, hydrotropes, and processing aids.

The present invention also encompasses a method of increasing the whitening effect/index on a textile article comprising the steps of (i) treating the textile article with the laundry care composition as described herein, and (ii) rinsing and drying the treated textile article. The step of treating the textile article may be bleach-free.

Also encompassed herein is a process for measurably improving a whitening effect on cellulose-containing textile articles, wherein the improvement is present in an amount that is greater than the amount observed on polyester-containing textile articles, wherein the process comprises the following steps: (a) providing a cellulose-containing textile substrate, (b) providing a polyester-containing textile substrate, (c) exposing the textile substrates of steps (a) and (b) to a laundry care composition comprised of: (i) a laundry care ingredient; and (ii) from 0.0001 wt % to 1.0 wt % of a polymeric thiophene hueing agent having the structure of Formula I:

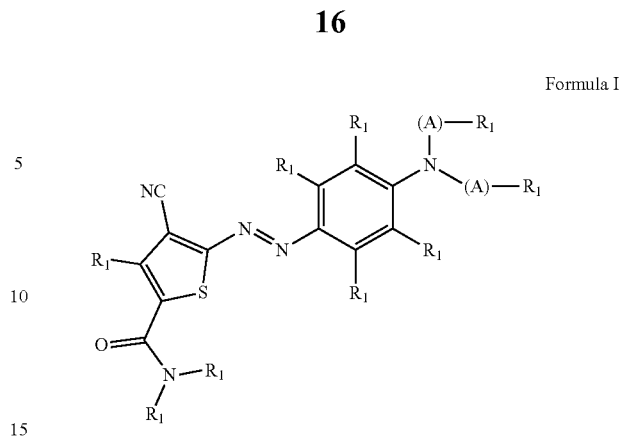

Formula I wherein each A is independently selected from the group consisting of polyethyleneoxy, polypropyleneoxy, and polyethyleneoxy/polypropyleneoxy copolymers, and wherein each A is independently present in the range from 1 to 20 repeating units of polyethyleneoxy, polypropyleneoxy or polyethyleneoxy/polypropyleneoxy copolymers; wherein each $R_1$ is independently selected from H, $C_{1-4}$ alkyl, alkoxy alkyl, halogens, aryl, substituted alkyl or substituted aryl, $-COR_2$, $-CH_2COH$, $-COOR_2$, $-COOH$, $-SO_3H$, $-CH_2COOH$, $-CH_2CH_2Cl$, $-CH=CH_2$, $-CH_2CH(OH)_2$, and salts thereof; wherein each $R_2$ is independently selected from $C_{1-18}$ alkyl, aryl, substituted aryl, and substituted alkyl; and (d) measuring the whitening effect via evaluation of the whiteness index of each textile article.

In another aspect of the invention there is a textile article, wherein the textile article contains: (a) a majority by weight of cellulose fiber, and (b) a laundry care composition comprising: (i) a laundry care ingredient; and (ii) from 0.0001 wt % to 1.0 wt % of a polymeric thiophene hueing agent having the structure of Formula III:

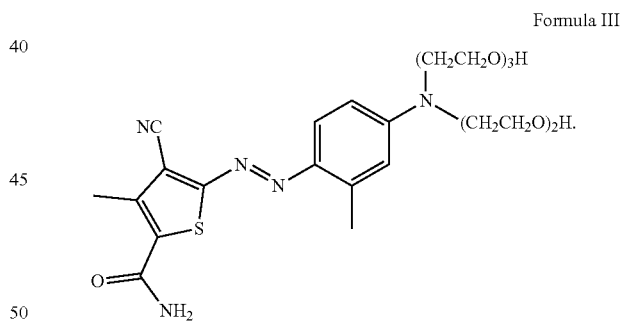

Formula III

In one aspect of the invention, the polymeric thiophene hueing agent can comprise any suitable alkyleneoxy group. Suitable alkyleneoxy groups include those of Formula (C) below:

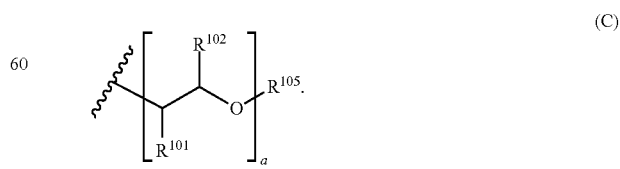

(C)

In the structure of Formula (C) and the other alkyleneoxy structures that follow, the carbon atom bonded to $R^{101}$ is also bonded to the nitrogen atom of the amine group. In the structure of Formula (C), each $R^{101}$ and $R^{102}$ group is independently selected from the group consisting of hydrogen, alkyl, aryl, alkoxyalkyl, and aryloxyalkyl. $R^{105}$ is a terminal group for the oxyalkylene and can be selected from the group consisting of hydrogen, alkyl groups (e.g., $C_1$-$C_4$ alkyl groups), and aryl groups, with hydrogen being preferred. Preferably, each $R^{101}$ and $R^{102}$ group is independently selected from the group consisting of hydrogen and alkyl (e.g., $C_1$-$C_4$ alkyl). The variable a is an integer equal to or greater than 1 (e.g., from 1 to about 100). For each monomer unit in the alkyleneoxy group, the $R^{101}$ and $R^{102}$ groups are independently selected from the recited group. Thus, when the variable a is greater than 1, the alkyleneoxy group can be comprised of two or more monomer units covalently bonded to form the alkyleneoxy group, or even three or more monomer units. When the alkyleneoxy group comprises two or more monomer units (or even three or more monomer units), these monomer units can be arranged in either a block configuration or in a random configuration, but a block configuration generally is more preferred. In a preferred embodiment, the alkyleneoxy group comprises monomer units independently selected from the group consisting of ethyleneoxy, propyleneoxy, and butyleneoxy. A suitable example of such an alkyleneoxy group is Formula (CI) below:

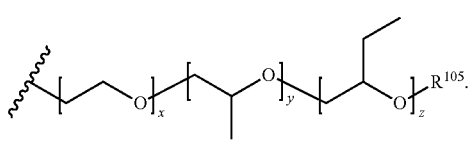

(CI)

In the structure of Formula (CI), the variables x, y, and z are independently selected from the group consisting of zero and positive integers (e.g., positive integers from 1 to about 100). Preferably, the sum of x, y, and z is 2 or more or 3 or more (e.g., 2 to about 300, 3 to about 300, 2 to about 200, 3 to about 200, 2 to about 100, 3 to about 100, 2 to about 50, 3 to about 50, 2 to about 30, 3 to about 30, 2 to about 25, 3 to about 25, 2 to about 20, 3 to about 20, 2 to about 15, 3 to about 15, 2 to about 10, or 3 to about 10). $R^{105}$ is a terminal group for the oxyalkylene and can be selected from the group consisting of hydrogen, alkyl groups (e.g., $C_1$-$C_4$ alkyl groups), and aryl groups, with hydrogen being preferred. In certain possibly preferred embodiments, the alkyleneoxy group comprises ethyleneoxy and propyleneoxy monomer units arranged in a block configuration. Suitable examples of such alkyleneoxy groups include those of Formulae (CII) and (CIII) below

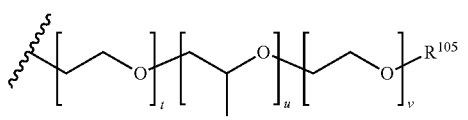

(CII)

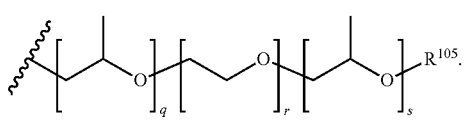

(CIII)

In the structures of Formulae (CII) and (CIII), the variables, t, u, v, q, r, and s are independently selected from the group consisting of zero and positive integers (e.g., positive integers from 1 to about 100). Preferably, the sum of t, u, and v and q, r, and s is 2 or more or 3 or more (e.g., 2 to about 300, 3 to about 300, 2 to about 200, 3 to about 200, 2 to about 100, 3 to about 100, 2 to about 50, 3 to about 50, 2 to about 30, 3 to about 30, 2 to about 25, 3 to about 25, 2 to about 20, 3 to about 20, 2 to about 15, 3 to about 15, 2 to about 10, or 3 to about 10). $R^{105}$ is a terminal group for the oxyalkylene and can be selected from the group consisting of hydrogen, alkyl groups (e.g., $C_1$-$C_4$ alkyl groups), and aryl groups, with hydrogen being preferred.

Alkoxylation is carried out by procedures well-known to those skilled in the art (see, for example, U.S. Pat. Nos. 4,137,243; 5,082,938; 5,135,972; 5,591,833; 6,593,483; 7,587,857; 9,056,963; and 9,068,081). Suitable $C_1$-$C_8$ alkoxy or alkoxy derivative of polyol having repeating units include alkylene oxides. Alkylene oxides may be selected from the group consisting of ethylene oxide, propylene oxide, butylene oxide, and mixtures thereof. Alkylene oxide groups may be in the form of polymeric chains known as polyalkyleneoxy chains. The term "polyalkyleneoxy," as used herein, generally refers to molecular structures containing the following repeating units: —$CH_2CH_2O$—, —$CH_2CH_2CH_2O$—, —$CH_2CH_2CH_2CH_2O$—, —$CH_2CH(CH_3)O$—, —$CH_2CH(CH_2CH_3)O$—$CH_2CH_2CH(CH_3)$O—, and any combinations thereof. Typical of such groups are the polymeric epoxides, such as the polyalkylene oxides and copolymers thereof. Typical polyalkylene oxides and copolymers of same include those made from alkylene oxide monomers containing from two to twenty carbon atoms, or more preferably, from two to six carbon atoms. Examples include: polyethylene oxides; polypropylene oxides; polybutylene oxides; oxetanes; tetrahydrafurans; copolymers of polyethylene oxides, polypropylene oxides and polybutylene oxides; and other copolymers including block copolymers, in which a majority of the polymeric substituent is polyethylene oxide, polypropylene oxide and/or polybutylene oxide. Further, such polyalkyleneoxy group may have an average molecular weight in the range of from about 132 to about 10,000, preferably from about 176 to about 5000.

Typically, the alkoxy molecules form caps for the ends of the chains comprising the polymeric thiophene hueing agent. Thus, the resulting alkoxylated polymeric thiophene hueing agent may have an average degree of alkoxylation of from 0.5 to 50, or from 1 to 50, or from 1 to 30, or from 1 to 20, or from 1 to 10, or from 2 to 50, or from 2 to 30, or from 2 to 20, or from 2 to 10, or from 3 to 50 or from 3 to 30, or from 3 to 20, or from 3 to 10, or from 4 to 50, or from 4 to 30, or from 4 to 20, or from 4 to 10.

Textile substrates treated with the laundry care composition(s) comprised of the polymeric thiophene hueing agent(s) of the present invention may be comprised of synthetic fibers, natural fibers, or combinations of synthetic and natural fibers. Synthetic fibers include, for example, polyester, acrylic, polyamide, polyolefin, polyaramid, polyurethane, regenerated cellulose (i.e., rayon), and blends thereof. The term "polyamide" is intended to describe any long-chain polymer having recurring amide groups (—NH—CO—) as an integral part of the polymer chain. Examples of polyamides include nylon 6; nylon 6, 6; nylon 1, 1; and nylon 6, 10. The term "polyester" is intended to describe any long-chain polymer having recurring ester groups (—C(O)—O—). Examples of polyesters include aromatic polyesters, such as polyethylene terephthalate (PET), polybutylene terephthalate (PBT), polytrimethylene terephthalate (PTT), and polytriphenylene terephthalate, and aliphatic polyesters, such as polylactic acid (PLA). "Polyolefin" includes, for example, polypropylene, polyethylene, and combinations thereof. "Polyaramid" includes, for example, poly-p-phenyleneteraphthalamid (i.e., Kevlar®), poly-m-phenyleneteraphthalamid (i.e., Nomex®), and combinations thereof. Natural fibers include, for example, wool, cotton, flax, and blends thereof.

The textile substrate may be formed from fibers or yarns of any size, including microdenier fibers and yarns (fibers or yarns having less than one denier per filament). The fibers or yarns may have deniers that range from less than about 1 denier per filament to about 2000 denier per filament or more preferably, from less than about 1 denier per filament to about 500 denier per filament, or even more preferably, from less than about 1 denier per filament to about 300 denier per filament.

Furthermore, the textile substrate may be partially or wholly comprised of multi-component or bi-component fibers or yarns, which may be splittable, or which have been partially or fully split, along their length by chemical or mechanical action. The textile substrate may be comprised of fibers such as staple fiber, filament fiber, spun fiber, or combinations thereof.

The textile substrate may be of any variety, including but not limited to, woven fabric, knitted fabric, nonwoven fabric, or combinations thereof. The textile substrate may optionally be colored by a variety of dyeing techniques, such as high temperature jet dyeing with disperse dyes, vat dyeing, thermosol dyeing, pad dyeing, transfer printing, screen printing, or any other technique that is common in the art for comparable textile products. The yarns or fibers comprising the textile substrate may optionally be dyed by suitable methods prior to fabric formation, such as, for instance, by package dyeing or solution dyeing.

Textile substrates include, for example, articles of apparel, such as outerwear (e.g., rainwear), workwear (e.g., uniforms), fashion apparel (e.g., shirts, pants, and other garments); drapery; napery (e.g., table linens and napkins); residential upholstery; commercial upholstery; automotive upholstery; wall coverings; floorcovering articles (e.g., carpets, rugs and mats); human bedding (e.g., mattresses, mattress covers, and the like); pet bedding; outdoor fabric (e.g., outdoor furniture, awnings, boat covers, and grill covers); medical dressings (e.g., fabrics for use in wound care); and any other article capable of possessing discoloration and wherein it is desirable to control (e.g. prevent, remove, and/or improve) said discoloration.

The polymeric thiophene hueing agent of the present invention may be incorporated into a laundry care composition including but not limited to laundry detergents and fabric treatment compositions. As used herein, the term "laundry care composition" includes, unless otherwise indicated, granular, powder, liquid, gel, paste, unit dose bar form and/or flake type washing agents and/or fabric treatment compositions. As used herein, the term "fabric treatment composition" includes, unless otherwise indicated, fabric softening compositions, fabric enhancing compositions, fabric freshening compositions, and combinations thereof. Such compositions may be, but need not be, rinse added compositions.

Laundry care compositions of the present invention comprise one or more of the polymeric thiophene hueing agents and a laundry care ingredient. The polymeric thiophene hueing agent may be added to articles using a variety of application techniques. For application to textile articles, the polymeric thiophene hueing agent is preferably included as an additive in laundry detergent. Thus, application to the textile article actually occurs when a consumer adds laundry detergent to a washing machine. Similarly, rinse added fabric softening ("RAFS") compositions are typically added in the rinse cycle, which is after the detergent solution has been used and replaced with the rinsing solution in typical laundering processes.

The polymeric thiophene hueing agent may be present in the laundry care composition (such as the laundry detergent composition) in an amount from about 0.0001% to about 10% by weight of the composition, more preferably from about 0.0001% to about 5% by weight of the composition, and even more preferably from about 0.0001% to about 1% by weight of the composition.

The laundry detergent composition comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10-16}$ alkyl benzene sulfonic acids, preferably $C_{11-14}$ alkyl benzene sulfonic acids. Preferably the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$, n is from about 1 to 6 or even from about 1 to 3 or from about 1 to 1.5 and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In specific embodiments, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates; d) $C_{10}$-$C_{18}$ alkyl alkoxy sulfates ($AE_xS$) wherein preferably x is from 1-30; e) $C_{10}$-$C_{18}$ alkyl alkoxy carboxylates preferably comprising 1-5 ethoxy units; f) mid-chain branched alkyl sulfates as discussed in U.S. Pat. Nos. 6,020,303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. Preferably $R^1$ is an alkyl group, which may be primary or secondary, that comprises from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 or even from about 7 to 9 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semipolar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. Nos. 6,153,577, 6,020,303 and 6,093,856; f) Alkylpolysaccharides as discussed in U.S. Pat. No. 4,565,647 to Llenado, issued Jan. 26, 1986; specifically alkylpolyglycosides as discussed in U.S. Pat. Nos. 4,483,780 and 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,6604,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (preferably $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, preferably $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

As noted, the compositions may be in the form of a solid, either in tablet or particulate form, including, but not limited to particles, flakes, or the like, or the compositions may be in the form of a liquid. The liquid detergent compositions comprise an aqueous, non-surface active liquid carrier. Generally, the amount of the aqueous, non-surface active liquid carrier employed in the compositions herein will be effective to solubilize, suspend or disperse the composition components. For example, the compositions may comprise, by weight, from about 5% to about 90%, more specifically from about 10% to about 70%, and even more specifically from about 20% to about 70% of the aqueous, non-surface active liquid carrier.

The most cost-effective type of aqueous, non-surface active liquid carrier is, of course, water itself. Accordingly, the aqueous, non-surface active liquid carrier component will generally be mostly, if not completely, comprised of water. However, other types of water-miscible liquids, such alkanols, diols, other polyols, ethers, amines, and the like, and mixtures thereof, may also be added to liquid detergent compositions as co-solvents or stabilizers in addition to or in place of water. Accordingly, the aqueous non-surface active liquid carrier component of the liquid detergent composition will generally be present in concentrations ranging from about 5% to about 90% by weight of the composition, more preferably from about 20% to about 70% by weight of the composition.

Detergent compositions may also contain bleaching agents. Suitable bleaching agents include, for example, hydrogen peroxide sources, such as those described in detail in the herein incorporated Kirk Othmer's Encyclopedia of Chemical Technology, 4th Ed (1992, John Wiley & Sons), Vol. 4, pp. 271-300 "Bleaching Agents (Survey)." These hydrogen peroxide sources include the various forms of sodium perborate and sodium percarbonate, including various coated and modified forms of these compounds.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A suitable percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators—Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. A bleach activator as used herein is any compound which, when used in conjunction with a hydrogen peroxide, source leads to the in situ production of the peracid corresponding to the bleach activator. Various non-limiting examples of activators are disclosed in U.S. Pat. Nos. 5,576,282; 4,915,854 and 4,412,934. See also U.S. Pat. No. 4,634,551 for other typical bleaches and activators useful herein.

Preferred activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzene-sulphonate (NOBS), phenyl benzoate (PhBz), decanoyloxybenzenesulphonate ($C_{10}$—OBS), benzoylvalerolactam (BZVL), octanoyloxybenzenesulphonate ($C_8$—OBS), perhydrolyzable esters and mixtures thereof, most preferably benzoylcaprolactam and benzoylvalerolactam. Particularly preferred bleach activators in the pH range from about 8 to about 11 are those selected having an OBS or VL leaving group.

Preferred hydrophobic bleach activators include, but are not limited to, nonanoyloxybenzenesulphonate (NOBS); 4-[N-(nonanoyl) amino hexanoyloxy]-benzene sulfonate sodium salt (NACA-OBS), an example of which is described in U.S. Pat. No. 5,523,434; dodecanoyloxybenzenesulphonate (LOBS or $C_{12}$—OBS); 10-undecenoyloxybenzenesulfonate (UDOBS or $C_{11}$—OBS with unsaturation in the 10 position); and decanoyloxybenzoic acid (DOBA).

Preferred bleach activators are those described in U.S. Pat. No. 5,998,350 to Burns et al.; U.S. Pat. No. 5,698,504 to Christie et al.; U.S. Pat. No. 5,695,679 to Christie et al.; U.S. Pat. No. 5,686,401 to Willey et al.; U.S. Pat. No. 5,686,014 to Hartshorn et al.; U.S. Pat. No. 5,405,412 to Willey et al.; U.S. Pat. No. 5,405,413 to Willey et al.; U.S. Pat. No. 5,130,045 to Mitchel et al.; and U.S. Pat. No. 4,412,934 to Chung et al., all of which are incorporated herein by reference.

The mole ratio of peroxygen source (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP, preferably a quaternary substituted percarboxylic acid or a quaternary substituted peroxyimidic acid); more preferably, the former. Preferred QSBA structures are further described in U.S. Pat. No. 5,686,015 to Willey et al.; U.S. Pat. No. 5,654,421 to Taylor et al.; U.S. Pat. No. 5,460,747 to Gosselink et al.; U.S. Pat. No. 5,584,888 to Miracle et al.; U.S. Pat. No. 5,578,136 to Taylor et al.; all of which are incorporated herein by reference.

Highly preferred bleach activators useful herein are amide-substituted as described in U.S. Pat. Nos. 5,698,504; 5,695,679; and 5,686,014, each of which are cited herein above. Preferred examples of such bleach activators include: (6-octanamidocaproyl) oxybenzenesulfonate, (6-nonanamidocaproyl)oxybenzenesulfonate, (6-decanamidocaproyl) oxybenzenesulfonate and mixtures thereof.

Other useful activators are disclosed in U.S. Pat. Nos. 5,698,504; 5,695,679; and 5,686,014, each of which is cited herein above, and in U.S. Pat. No. 4,966,723 to Hodge et al. These activators include benzoxazin-type activators, such as a $C_6H_4$ ring to which is fused in the 1,2-positions a moiety —C(O)OC($R^1$)=N—.

Nitriles, such as acetonitriles and/or ammonium nitriles and other quaternary nitrogen containing nitriles, are another class of activators that are useful herein. Non-limiting examples of such nitrile bleach activators are described in U.S. Pat. Nos. 6,133,216; 3,986,972; 6,063,750; 6,017,464; 5,958,289; 5,877,315; 5,741,437; 5,739,327; 5,004,558; and in EP Nos. 790 244, 775 127, 1 017 773, 1 017 776; and in WO 99/14302, WO 99/14296, WO96/40661, all of which are incorporated herein by reference.

Depending on the activator and precise application, good bleaching results can be obtained from bleaching systems having an in-use pH of from about 6 to about 13, and preferably from about 9.0 to about 10.5. Typically, for example, activators with electron-withdrawing moieties are used for near-neutral or sub-neutral pH ranges. Alkalis and buffering agents can be used to secure such pH.

Acyl lactam activators, as described in U.S. Pat. Nos. 5,698,504; 5,695,679 and 5,686,014, each of which is cited herein above, are very useful herein, especially the acyl caprolactams (see for example WO 94-28102 A) and acyl valerolactams (see U.S. Pat. No. 5,503,639 to Willey et al. incorporated herein by reference).

(b) Organic Peroxides, especially Diacyl Peroxides—These are extensively illustrated in Kirk Othmer, Encyclopedia of Chemical Technology, Vol. 17, John Wiley and Sons, 1982 at pages 27-90 and especially at pages 63-72, all incorporated herein by reference. If a diacyl peroxide is used, it will preferably be one which exerts minimal adverse impact on fabric care, including color care.

(c) Metal-Containing Bleach Catalysts—The compositions and methods of the present invention can also optionally include metal-containing bleach catalysts, preferably manganese and cobalt-containing bleach catalysts.

One type of metal-containing bleach catalyst is a catalyst system comprising a transition metal cation of defined bleach catalytic activity (such as copper, iron, titanium, ruthenium tungsten, molybdenum, or manganese cations), an auxiliary metal cation having little or no bleach catalytic activity (such as zinc or aluminum cations), and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 to Bragg.

Manganese Metal Complexes—If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1; 549,272 A1; 544,440 A2; and 544,490 A1. Preferred examples of these catalysts include $Mn^{IV}_2(u-O)_3(1,4,7\text{-trimethyl-}1,4,7\text{-triazacyclononane})_2\text{-}(PF_6)_2$, $Mn^{III}_2(u-O)_1(u-OAc)_2(1,4,7\text{-trimethyl-}1,4,7\text{-triazacyclononane})_2(ClO_4)_2$, $Mn^{IV}_4(u-O)_6(1,4,7\text{-triazacyclononane})_4(ClO_4)_4$, $Mn^{III}Mn^{IV}_4(u-O)_1(u-OAc)_2\text{-}(1,4,7\text{-trimethyl-}1,4,7\text{-triazacyclononane})_2(ClO_4)_3$, $Mn^{IV}(1,4,7\text{-trimethyl-}1,4,7\text{-triazacyclononane})\text{-}(OCH_3)_3(PF_6)$, and mixtures thereof. Other metal-based bleach catalysts include those disclosed in U.S. Pat. Nos. 4,430,243 and 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes—Cobalt bleach catalysts useful herein are known, and are described, for example, in U.S. Pat. Nos. 5,597,936; 5,595,967; and 5,703,030; and M. L. Tobe, "Base Hydrolysis of Transition-Metal Complexes", Adv. Inorg. Bioinorg. Mech., (1983), 2, pages 1-94. The most preferred cobalt catalyst useful herein are cobalt pentaamine acetate salts having the formula $[Co(NH_3)_5OAc]T_y$, wherein "OAc" represents an acetate moiety and "$T_y$" is an anion, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co(NH_3)_5OAc](BF_4)_2$; and $[Co(NH_3)_5OAc](NO_3)_2$ (herein "PAC").

These cobalt catalysts are readily prepared by known procedures, such as taught for example in U.S. Pat. Nos. 6,302,921; 6,287,580; 6,140,294; 5,597,936; 5,595,967; and 5,703,030; in the Tobe article and the references cited therein; and in U.S. Pat. No. 4,810,410; J. Chem. Ed. (1989), 66 (12), 1043-45; The Synthesis and Characterization of Inorganic Compounds, W. L. Jolly (Prentice-Hall; 1970), pp. 461-3; Inorg. Chem., 18, 1497-1502 (1979); Inorg. Chem., 21, 2881-2885 (1982); Inorg. Chem., 18, 2023-2025 (1979); Inorg. Synthesis, 173-176 (1960); and Journal of Physical Chemistry, 56, 22-25 (1952).

Transition Metal Complexes of Macropolycyclic Rigid Ligands—Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition-metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and are non-limitingly illustrated by any of the following:

Dichloro-5,12-dimethyl-1,5,8,12-tetraazabicyclo[6.6.2] hexadecane Manganese(II)

Dichloro-5,12-diethyl-1,5,8,12-tetraazabicyclo[6.6.2]hexadecane Manganese(II)

Diaquo-5,12-dimethyl-1,5,8,12-tetraazabicyclo[6.6.2]hexadecane Manganese(II) Hexafluorophosphate Diaquo-5,12-diethyl-1,5,8,12-tetraazabicyclo[6.6.2]hexadecane Manganese(II) Hexafluorophosphate Aquo-hydroxy-5,12-dimethyl-1,5,8,12-tetraazabicyclo[6.6.2]hexadecane Manganese(III) Hexafluorophosphate Diaquo-5,12-dimethyl-1,5,8,12-tetraazabicyclo[6.6.2]hexadecane Manganese(II) Tetrafluoroborate Dichloro-5,12-dimethyl-1,5,8,12 tetraazabicyclo[6.6.2] hexadecane Manganese(III) Hexafluorophosphate Dichloro-5,12-diethyl-1,5,8,12-tetraazabicyclo[6.6.2]hexadecane Manganese(III) Hexafluorophosphate Dichloro-5,12-di-n-butyl-1,5,8,12-tetraaza bicyclo[6.6.2] hexadecane Manganese(II)

Dichloro-5,12-dibenzyl-1,5,8,12-tetraazabicyclo[6.6.2] hexadecane Manganese(II)

Dichloro-5-n-butyl-12-methyl-1,5,8,12-tetraaza-bicyclo [6.6.2]hexadecane Manganese(II)

Dichloro-5-n-octyl-12-methyl-1,5,8,12-tetraaza-bicyclo [6.6.2]hexadecane Manganese(II)

Dichloro-5-n-butyl-12-methyl-1,5,8,12-tetraaza-bicyclo [6.6.2]hexadecane Manganese(II).

As a practical matter, and not by way of limitation, the compositions and methods herein can be adjusted to provide on the order of at least one part per hundred million of the active bleach catalyst species in the composition comprising a lipophilic fluid and a bleach system, and will preferably provide from about 0.01 ppm to about 25 ppm, more preferably from about 0.05 ppm to about 10 ppm, and most preferably from about 0.1 ppm to about 5 ppm, of the bleach catalyst species in the composition comprising a lipophilic fluid and a bleach system.

(d) Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

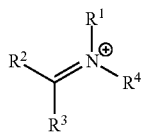

[A]

where $R^1$-$R^4$ may be a hydrogen or an unsubstituted or substituted radical selected from the group consisting of phenyl, aryl, heterocyclic ring, alkyl and cycloalkyl radicals.

Among preferred bleach boosting compounds are zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are preferably employed in conjunction with a peroxygen source in the bleaching systems of the present invention.

(e) Preformed Peracids—Also suitable as bleaching agents are preformed peracids. The preformed peracid compound as used herein is any convenient compound which is stable and which under consumer use conditions provides an effective amount of peracid or peracid anion. The preformed peracid compound may be selected from the group consisting of percarboxylic acids and salts, percarbonic acids and salts, perimidic acids and salts, peroxymonosulfuric acids and salts, and mixtures thereof. Examples of these compounds are described in U.S. Pat. No. 5,576,282 to Miracle et al.

One class of suitable organic peroxycarboxylic acids have the general formula:

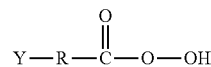

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Organic peroxyacids suitable for use in the present invention can contain either one or two peroxy groups and can be either aliphatic or aromatic. When the organic peroxycarboxylic acid is aliphatic, the unsubstituted peracid has the general formula:

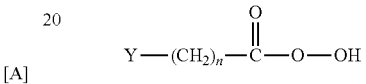

wherein Y can be, for example, H, $CH_3$, $CH_2Cl$, C(O)OH, or C(O)OOH; and n is an integer from 0 to 20. When the organic peroxycarboxylic acid is aromatic, the unsubstituted peracid has the general formula:

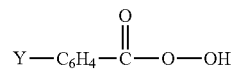

wherein Y can be, for example, hydrogen, alkyl, alkylhalogen, halogen, C(O)OH or C(O)OOH.

Typical monoperoxy acids useful herein include alkyl and aryl peroxyacids such as:
(i) peroxybenzoic acid and ring-substituted peroxybenzoic acid, e.g. peroxy-α-naphthoic acid, monoperoxyphthalic acid (magnesium salt hexahydrate), and o-carboxybenzamidoperoxyhexanoic acid (sodium salt);
(ii) aliphatic, substituted aliphatic and arylalkyl monoperoxy acids, e.g. peroxylauric acid, peroxystearic acid, N-nonanoylaminoperoxycaproic acid (NAPCA), N,N-(3-octylsuccinoyl)aminoperoxycaproic acid (SAPA) and N,N-phthaloylaminoperoxycaproic acid (PAP);
(iii) amidoperoxyacids, e.g. mononoylamide of either peroxysuccinic acid (NAPSA) or of peroxyadipic acid (NAPAA).

Typical diperoxyacids useful herein include alkyl diperoxyacids and aryldiperoxyacids, such as:
(i) 1,12-diperoxydodecanedioic acid;
(ii) 1,9-diperoxyazelaic acid;
(iii) diperoxybrassylic acid; diperoxysebacic acid and diperoxyisophthalic acid;
(iv) 2-decyldiperoxybutane-1,4-dioic acid;
(v) 4,4'-sulfonylbisperoxybenzoic acid.

Such bleaching agents are disclosed in U.S. Pat. No. 4,483,781 to Hartman and U.S. Pat. No. 4,634,551 to Burns et al.; European Patent Application 0,133,354 to Banks et al.; and U.S. Pat. No. 4,412,934 to Chung et al. Sources also include 6-nonylamino-6-oxoperoxycaproic acid as described in U.S. Pat. No. 4,634,551 to Burns et al. Persulfate compounds such as for example OXONE, manufactured commercially by E.I. DuPont de Nemours of Wilmington, Del. can also be employed as a suitable source of peroxymonosulfuric acid. PAP is disclosed in, for example, U.S. Pat. Nos. 5,487,818; 5,310,934; 5,246,620; 5,279,757 and 5,132,431.

(f) Photobleaches—Suitable photobleaches for use in the treating compositions of the present invention include, but are not limited to, the photobleaches described in U.S. Pat. Nos. 4,217,105 and 5,916,481.

(g) Enzyme Bleaching—Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

The detergent compositions of the present invention may also include any number of additional optional ingredients. These include conventional laundry detergent composition components such as non-tinting dyes, detersive builders, enzymes, enzyme stabilizers (such as propylene glycol, boric acid and/or borax), suds suppressors, soil suspending agents, soil release agents, other fabric care benefit agents, pH adjusting agents, chelating agents, smectite clays, solvents, hydrotropes and phase stabilizers, structuring agents, dye transfer inhibiting agents, opacifying agents, optical brighteners, perfumes and coloring agents. The various optional detergent composition ingredients, if present in the compositions herein, should be utilized at concentrations conventionally employed to bring about their desired contribution to the composition or the laundering operation. Frequently, the total amount of such optional detergent composition ingredients can range from about 0.01% to about 50%, more preferably from about 0.1% to about 30%, by weight of the composition.

The liquid detergent compositions are in the form of an aqueous solution or uniform dispersion or suspension of surfactant, polymeric thiophene hueing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, more preferably from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a preferred process for preparing such compositions, a liquid matrix is formed containing at least a major proportion, and preferably substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In an alternate embodiment for forming the liquid detergent compositions, the polymeric thiophene hueing agent is first combined with one or more liquid components to form a polymeric thiophene hueing agent premix, and this premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the polymeric thiophene hueing agent premix and the enzyme component are added at a final stage of component additions. In a further embodiment, the polymeric thiophene hueing agent is encapsulated prior to addition to the detergent composition, the encapsulated polymeric thiophene hueing agent is suspended in a structured liquid, and the suspension is added to a composition formulation containing a substantial portion of the balance of components of the laundry detergent composition.

The compositions of this invention, prepared as hereinbefore described, can be used to form aqueous washing solutions for use in the laundering of textile substrates such as fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution. More preferably, from about 1,000 to 3,000 ppm of the detergent compositions herein will be provided in aqueous washing solution.

Fabric Treatment Compositions/Rinse Added Fabric Softening Compositions

In another specific embodiment, the polymeric thiophene hueing agent of the present invention may be included in a fabric treatment composition. The fabric treatment composition may be comprised of at least one polymeric thiophene hueing agent and a rinse added fabric softening composition ("RAFS;" also known as rinse added fabric conditioning compositions). Examples of typical rinse added softening compositions can be found in U.S. Provisional Patent Application Ser. No. 60/687,582 filed on Oct. 8, 2004. The rinse added fabric softening compositions of the present invention may comprise (a) fabric softening active ("FSA") and (b) a polymeric thiophene hueing agent. The rinse added fabric softening composition may comprise from about 1% to about 90% by weight of the FSA, more preferably from about 5% to about 50% by weight of the FSA. The polymeric thiophene hueing agent may be present in the rinse added fabric softening composition in an amount from about 0.5 ppb to about 50 ppm, more preferably from about 0.5 ppm to about 30 ppm.

In one embodiment of the invention, the fabric softening active is a quaternary ammonium compound suitable for softening fabric in a rinse step. In one embodiment, the FSA is formed from a reaction product of a fatty acid and an aminoalcohol obtaining mixtures of mono-, di-, and, in one embodiment, triester compounds. In another embodiment, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain embodiments of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA includes a compound comprising the formula:

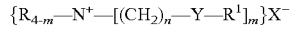

wherein each R substituent is either hydrogen, a short chain $C_1$-$C_6$, preferably $C_1$-$C_3$ alkyl or hydroxyalkyl group, e.g., methyl (most preferred), ethyl, propyl, hydroxyethyl, and the like, poly ($C_{2-3}$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, preferably $C_{14}$-$C_{20}$, with each $R^1$ being a hydrocarbyl, or substituted hydrocarbyl group; it is acceptable for $R^1$ to be unsaturated or saturated and branched or linear and preferably it is linear; it is acceptable for each $R^1$ to be the same or different and preferably these are the same; and $X^-$ can be any softener-compatible anion, preferably, chloride, bromide, methylsulfate, ethylsulfate, sulfate, phosphate, and nitrate, more preferably chloride or methyl sulfate. Preferred DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardened tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one embodiment, the FSA comprises other actives in addition to DQA (1) or DQA. In yet another embodiment, the FSA comprises only DQA (1) or DQA and is free or essentially free of any other quaternary ammonium compounds or other actives. In yet another embodiment, the FSA comprises the precursor amine that is used to produce the DQA.

In another aspect of the invention, the FSA comprises a compound, identified as DTTMAC comprising the formula:

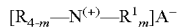

wherein each m is 2 or 3, each $R^1$ is a $C_6$-$C_{22}$, preferably $C_{14}$-$C_{20}$, but no more than one being less than about $C_{12}$ and then the other is at least about 16, hydrocarbyl, or substituted hydrocarbyl substituent, preferably $C_{10}$-$C_{20}$ alkyl or alkenyl (unsaturated alkyl, including polyunsaturated alkyl, also referred to sometimes as "alkylene"), most preferably $C_{12}$-$C_{18}$ alkyl or alkenyl, and branch or unbranched. In one embodiment, the Iodine Value (IV) of the FSA is from about 1 to 70; each R is H or a short chain $C_1$-$C_6$, preferably $C_1$-$C_3$ alkyl or hydroxyalkyl group, e.g., methyl (most preferred), ethyl, propyl, hydroxyethyl, and the like, benzyl, or $(R^2O)_{2-4}H$ where each $R^2$ is a $C_{1-6}$ alkylene group; and $A^-$ is a softener compatible anion, preferably, chloride, bromide, methylsulfate, ethylsulfate, sulfate, phosphate, or nitrate; more preferably chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one embodiment, the FSA comprises other actives in addition to DTTMAC. In yet another embodiment, the FSA comprises only compounds of the DTTMAC and is free or essentially free of any other quaternary ammonium compounds or other actives.

In one embodiment, the FSA comprises an FSA described in U.S. Pat. Pub. No. 2004/0204337 A1, published Oct. 14, 2004 to Corona et al., from paragraphs 30-79. In another embodiment, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one embodiment, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one embodiment, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another specific embodiment of the invention provides for a rinse added fabric softening composition further comprising a cationic starch. Cationic starches are disclosed in US 2004/0204337 A1. In one embodiment, the rinse added fabric softening composition comprises from about 0.1% to about 7% of cationic starch by weight of the fabric softening composition. In one embodiment, the cationic starch is HCP401 from National Starch.

Suitable Laundry Care Ingredients

While not essential for the purposes of the present invention, the non-limiting list of laundry care ingredients illustrated hereinafter are suitable for use in the laundry care compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular embodiment. The total amount of such adjuncts may range from about 0.1% to about 50%, or even from about 1% to about 30%, by weight of the laundry care composition.

The precise nature of these additional components, and levels of incorporation thereof, will depend on the physical form of the composition and the nature of the operation for which it is to be used. Suitable laundry care ingredients include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or coloring agents. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or coloring agents. However, when one or more adjuncts are present, such one or more adjuncts may be present as detailed below:

Surfactants—The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes—Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane. Suitable transition metal MRLs are readily prepared by known procedures, such as taught for example in WO 00/32601, and U.S. Pat. No. 6,225,464.

Exemplary Laundry Care Composition Formulations:
Liquid Detergent Formulations:
Table A provides examples of liquid detergent formulations which include at least one polymeric thiophene hueing agent of the present invention.

TABLE A

Liquid Detergent Formulations Comprising Polymeric Thiophene Hueing Agent

| Ingredient | 1a wt % | 1b wt % | 1c wt % | 1d wt % | 1e wt % | 1f [4] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Polymeric Thiophene Hueing Agent | 0.013% | 0.001% | 0.005% | 0.003% | 0.0005% | 0.001% |
| water | balance | balance | balance | balance | balance | balance |
| | 100.0% | 100.0% | 100.0% | 100.0% | 100.0% | 100.0% |

[1] diethylenetriaminepentaacetic acid, sodium salt
[2] diethylenetriaminepentakismethylenephosphonic acid, sodium salt
[3] ethylenediaminetetraacetic acid, sodium salt
[4] a compact formula, packaged as a unitized dose in polyvinyl alcohol film Granular Detergent Formulations:

Table B provides examples of granular detergent formulations which include at least one polymeric thiophene hueing agent of the present invention.

TABLE B

Granular Detergent Formulations Comprising Polymeric Thiophene Hueing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% | | 4.0% | 4.1% |
| Na alkyl sulfate (branched) | 9.4% | 9.6% | | 9.4% | 9.6% |
| alkyl ethoxylate | | | 3.5% | | |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% | | 18.8% | 1.0% | |
| sodium silicate | | | 2.2% | | |
| protease | 0.1% | 0.2% | | 0.1% | 0.2% |
| sodium polyacrylate | 1.0% | 1.2% | 0.7% | 1.0% | 1.2% |
| carboxymethylcellulose | | | 0.1% | | |
| PEG 600 | | 0.5% | | | 0.5% |
| PEG 4000 | | 2.2% | | | 2.2% |
| DTPA | 0.7% | 0.6% | | 0.7% | 0.6% |
| fluorescent whitening agent | 0.1% | 0.1% | 0.1% | 0.1% | 0.1% |
| sodium percarbonate | | 5.0% | | | 5.0% |
| sodium nonanoyloxy-benzenesulfonate | | 5.3% | | | 5.3% |
| silicone suds suppressor | 0.02% | 0.02% | | 0.02% | 0.02% |
| perfume | 0.3% | 0.3% | 0.2% | 0.3% | 0.3% |
| Polymeric Thiophene Hueing Agent | 0.004% | 0.006% | 0.002% | 0.004% | 0.02% |
| water and miscellaneous | balance | balance | balance | balance | balance |
| | 100.0% | 100.0% | 100.0% | 100.0% | 100.0% |

Fabric Treatment Compositions:

Table C provides examples of liquid fabric treatment compositions which include at least one polymeric thiophene hueing agent of the present invention.

TABLE C

Liquid Fabric Treatment Compositions Comprising Polymeric Thiophene Hueing Agent

| Ingredients | a | b | c | d |
|---|---|---|---|---|
| Fabric Softening Active[a] | 13.70% | 13.70% | 13.70% | 13.70% |
| Ethanol | 2.14% | 2.14% | 2.14% | 2.14% |
| Cationic Starch[b] | 2.17% | 2.17% | 2.17% | 2.17% |
| Perfume | 1.45% | 1.45% | 1.45% | 1.45% |
| Phase Stabilizing Polymer[c] | 0.21% | 10.21% | 0.21% | 10.21% |
| Calcium Chloride | 0.147% | 0.147% | 0.147% | 0.147% |
| DTPA[d] | 0.007% | 0.007% | 0.007% | 0.007% |
| Preservative[e] | 5 ppm | 5 ppm | 5 ppm | 5 ppm |
| Antifoam[f] | 0.015% | 0.015% | 0.015% | 0.015% |
| Polymeric Thiophene Hueing Agent | 30 ppm | 30 ppm | 30 ppm | 15 ppm |
| Tinopal CBS-X[g] | 0.2 | 0.2 | 0.2 | 10.2 |
| Ethoquad C/25[h] | 0.26 | 10.26 | 0.26 | 10.26 |

TABLE C-continued

Liquid Fabric Treatment Compositions Comprising Polymeric Thiophene Hueing Agent

| Ingredients | a | b | c | d |
|---|---|---|---|---|
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

[a]N, N-di(tallowoyloxyethyl)-N,N-dimethylammonium chloride.
[b]Cationic starch based on common maize starch or potato starch, containing 25% to 95% amylose and a degree of substitution of from 0.02 to 0.09, and having a viscosity measured as Water Fluidity having a value from 50 to 84.
[c]Copolymer of ethylene oxide and terephthalate having the formula described in U.S. Pat. No. 5,574,179 at col.15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d]Diethylenetriaminepentaacetic acid.
[e]KATHON ® CG available from Rohm and Haas Co.
[f]Silicone antifoam agent available from Dow Corning Corp. under the trade name DC2310.
[g]Disodium 4,4'-bis-(2-sulfostyryl) biphenyl, available from Ciba Specialty Chemicals.
[h]Cocomethyl ethoxylated [15] ammonium chloride, available from Akzo Nobel.

EXAMPLES

The following examples further illustrate the subject matter described above but, of course, should not be construed as in any way limiting the scope thereof.

Polymeric thiophene hueing agent of Formula I was synthesized and tested for its deposition during the wash cycle at several concentrations in laundry detergent and fabric softening compositions. The washings were carried out for cotton and polyester-containing fabrics. Detailed synthesis and testing results are reported below in more detail.

Test Procedures:

Method for Determining Relative Hue Angle (vs. AATCC Control) (Ref: WO2019075142A1):

The relative hue angle delivered by a hueing agent to cotton fabrics treated according to Method I described below was determined as follows:

a) The a* and b* values of the 4 swatches from each solution were averaged and the following formulas used to determine Aa* and Ab*

$$Aa^* = a^*_s - a^*_c \text{ and } Ab^* = b^*_s - b^*_c$$

wherein the subscripts c and s respectively refer to the fabric washed in AATCC heavy duty liquid detergent nil brightener (control) and the fabric washed in the laundry care formulation containing the hueing agents (sample).

b) If the absolute value of both Aa* and Ab*<0.25, no Relative Hue Angle (RHA) was calculated. If the absolute value of either Aa* or Ab* is >0.25, the RHA was determined using one of the following formulas:

$$RHA = A \text{ TAN } 2(Aa^*, Ab^*) \text{ for } Ab^* > 0$$

$$RHA = 360 + A \text{ TAN } 2(Aa^*, Ab^*) \text{ for } Ab^* < 0.$$

Method for Determining ΔWI:

The WI CIE values of the swatches for each wash solution was calculated using the following equation:

$$\Delta WI = WI \text{ CIE (after wash)} - WI \text{ CIE(before wash)}.$$

Method for Calculating ΔE:

L*, a*, b* values were taken and converted into delta E values by calculating the difference in L, a and b between the after-wash measurements and those of an identical white cloth which had not been washed with hueing agent and then applying the equation:

$$\Delta E = \sqrt{\Delta L^2 + \Delta a^2 + \Delta b^2}.$$

The bias for cotton is determined by the following equation:

$$\text{Bias} = \frac{(\Delta WI \text{ on Cotton})}{(\Delta WI \text{ on PE})}$$

Method I: Wash Test Method for Determining Whitening
Preparation of Test Fabrics:

Test fabrics (purchased from Testfabrics, Inc.) included a bleached cotton t-shirt fabric 60" open width style number 437W-60, texturized polyester interlock knit fabric style number 730, and texturized nylon 6,6 stretch fabric double knit style number 314. Each sample was cut to 16 cm by 16 cm in size. The fabrics were prepared prior to use by washing one full cycle in AATCC liquid laundry detergent without brighteners and then rinsed twice prior to drying.

Preparation of Wash Water Solution Containing the Hueing Dye:

A sufficient volume of wash water containing liquid or powder detergent without brightener was prepared by dissolving the detergent in tap water at room temperature at a concentration of 1 gram per liter. Both Comparative Hueing Agent 1 and Inventive Hueing Agent 1 were then added to the wash water in amounts to give the same absorptivity in each wash solution. This amount of hueing agent for each experiment corresponds to about 3 ppm in wash water. For multi-wash experiments, the hueing agent was present at 1 ppm in wash water.

Wash Procedure:

Washing tests were completed using a tergotometer. A fabric mixture was used for each wash that was composed of 63% cotton, 25% polyester and 12% nylon. Total fabric in wash water corresponded to a 25:1 liquor:fabric ratio. Fabrics were agitated at 220 rpm for 15 minutes. After washing, each set of fabrics was rinsed twice with tap water. After rinsing, all fabrics were dried in a dryer for one hour. After drying, the fabric samples were read using an X-Rite Color i7 spectrophotometer. The average reflectance of all samples for each fabric type at each wash condition was used to calculate L*, a*, b*, and WI-CIE values.

Example 1

A polymeric thiophene hueing agent was made according to the procedure described below.

Comparative Hueing Agent 1, prepared with m-toluidine 5EO according to Example 3 of U.S. Pat. No. 4,912,203, was treated under basic conditions (pH >9) to form Inventive Hueing Agent 1. Surprisingly, upon treating comparative hueing agent with base, decomposition of the azo colorant was not observed. Instead, selective hydrolysis of one nitrile bond to the amide could be achieved to give the Inventive Hueing Agent 1. These two hueing agents were tested against each other for comparative purposes.

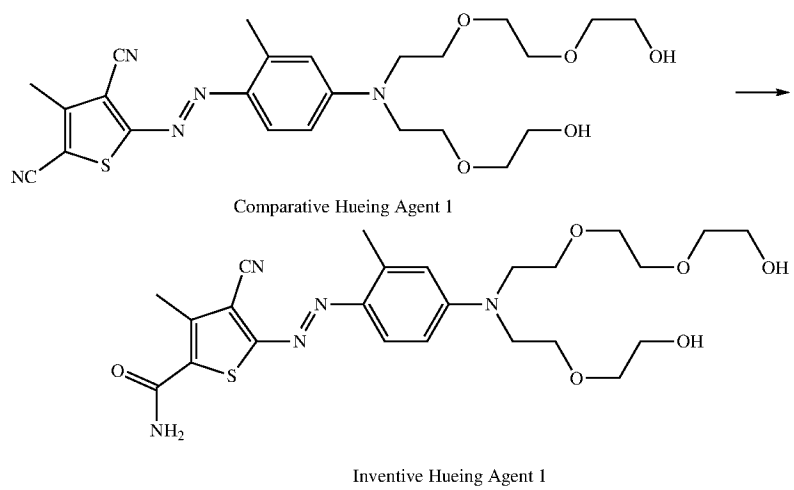

Comparative Hueing Agent 1

Inventive Hueing Agent 1

To a round bottom flask was charged a polyethylene glycol 200 solution containing 13 g of Comparative Hueing Agent 1, prepared according to Example 3 from U.S. Pat. No. 4,912,203 (25 mmol), water (33 mL) and 50% aqueous sodium hydroxide (25 mmol). The pH was >9. The mixture was heated to 90° C. for 1 hour, whereby UPLC analysis showed completion of the reaction. The solution was neutralized to a pH of 7 with acetic acid. A reddish-violet solution containing 3.5 wt % of dissolved Inventive Hueing Agent 1 was obtained.

The Inventive Hueing Agent 1 was compared to the Comparative Hueing Agent 1 using the test conditions listed above. Table 1 shows the improvements in whitening and changes in hue angle on both cotton and polyester fabrics upon treatment with the composition containing Inventive Hueing Agent 1 vs Comparative Hueing Agent 1 on cotton fabric at 3 ppm in wash water loading.

TABLE 1

Whitening Effect of Hueing Agents

| Hueing Agent | ΔWI on Cotton | Relative Hue Angle on Cotton | ΔWI on Polyester | Relative Hue Angle on Polyester | Bias for Cotton |
|---|---|---|---|---|---|
| Comparative Hueing Agent 1 | 5.9 | 268 | 5.4 | 271 | 1.09 |
| Inventive Hueing Agent 1 | 8.6 | 301 | 1.7 | 295 | 5.06 |

Test results on cotton fabric illustrate whitening performance of Inventive Hueing Agent 1 improved almost 3 units over Comparative Hueing Agent 1. In addition, the hue angle on the fabric treated with Inventive Hueing Agent 1 shifted to a more reddish shade, which in some applications is preferred by consumers.

When the whitening bias was calculated using the equation above, the whitening improvement on cotton treated with Inventive Hueing Agent 1 was five times that of polyester fabric. In comparison, there was no real bias when treated with Comparative Hueing Agent 1. Since cotton fabrics tend to yellow over time on exposure to light, air and contaminants more than synthetic fabrics, the need for a hueing agent that targets cotton over polyester is very important.

Additionally, the composition containing Inventive Hueing Agent 1 showed a leveling effect, wherein the ΔE of the fabric did not change in comparison to fabric washed without the inventive hueing dye after multiple washes. This result indicates that an equilibrium hueing point was reached where the amount of dye depositing through subsequent washes is equal to the dye being removed from the fabric in those washes. Therefore, another advantage of the present invention is that an optimum level of hueing on the fabric was reached without staining the fabric. Test results are shown in Table 2.

TABLE 2

Multi-Wash Data for Cotton at 1 ppm in Wash Water

| Hueing Agent | ΔE* after 1 wash | ΔE* after 3 washes | ΔE* after 5 washes | ΔE* after 8 washes |
|---|---|---|---|---|
| Inventive Hueing Agent 1 | 1.6 | 2.9 | 3.2 | 3.4 |

The effect of whitening was also evaluated using a blend of hueing agents. Fabrics were washed according to the wash method described herein (at 3 ppm total loading of hueing dyes) with varying ratios of Inventive Hueing Agent 1 to Hueing Agent 2. Hueing Agent 2 is represented by Formula Y. Test results are provided in Tables 3 and 4. Test results demonstrate variations in the relative hue angle on the fabric, which may be desirable as different regions in the world have a preference for various hue on fabric. Thus, being able to tune the perceived whitening benefits through adjusting the hue angle is important. Test results further illustrate that the ratios of the two hueing agents (Inventive Hueing Agent 1 and Hueing Agent 2) can be varied to target a desired hue angle between 270 and 300 on both cotton and polyester fabrics. The hueing agents alone may give ranges that are slightly outside of the desired hue angle (dependent on detergent and fabric).

TABLE 3

Relative Hue Angle on Cotton vs Ratio of Hueing Agents at 3 ppm Total Loading in Wash Water

|  | 100% Hueing Agent 2 | 75% Hueing Agent 2: 25% Inventive Hueing Agent 1 | 50% Hueing Agent 2: 50% Inventive Hueing Agent 1 | 25% Hueing Agent 2: 75% Inventive Hueing Agent 1 | 100% Inventive Hueing Agent 1 |
|---|---|---|---|---|---|
| Relative Hue Angle (RHA) from AATCC Liquid Detergent | 274 | 282 | 295 | 299 | 302 |
| Relative Hue Angle (RHA) from AATCC Powder Detergent | 268 | 282 | 293 | 296 | 301 |

TABLE 4

Relative Hue Angle on Polyester vs Ratio of Hueing Agents at 3 ppm Total Loading in Wash Water

|  | 100% Hueing Agent 2 | 75% Hueing Agent 2: 25% Inventive Hueing Agent 1 | 50% Hueing Agent 2: 50% Inventive Hueing Agent 1 | 25% Hueing Agent 2: 75% Inventive Hueing Agent 1 | 100% Inventive Hueing Agent 1 |
|---|---|---|---|---|---|
| Relative Hue Angle (RHA) from AATCC Liquid Detergent | 276 | 275 | 280 | 281 | 292 |
| Relative Hue Angle (RHA) from AATCC Powder Detergent | 271 | 272 | 274 | 275 | 295 |

Additional testing was performed to compare each of Inventive Hueing Agent 1 and Hueing Agent 2 on cotton fabric at 1 ppm loading levels. Test results are provided in Table 5. Test results demonstrate that both hueing agents build on fabric, as determined by ΔE, but level off after a certain number of washes. This is advantageous in that the hueing agents will not stain the fabric but will give enough hueing to eliminate the yellowing of dingy fabric.

TABLE 5

Multi-Wash Data for Cotton at 1 ppm of Hueing Agent in Wash Water

| Hueing Agent | ΔE* after 1 wash | ΔE* after 3 washes | ΔE* after 5 washes | ΔE* after 8 washes |
|---|---|---|---|---|
| Inventive Hueing Agent 1 (100%) | 1.2 | 2.1 | 2.2 | 2.2 |
| Hueing Agent 2 (100%) | 1.6 | 2.9 | 3.2 | 3.4 |

It should be noted that, unlike many traditional dyes, the polymeric thiophene hueing agents of the present invention and laundry care compositions containing the same do not require the inclusion of a bleaching agent to remove the excess due to over-hueing of the fabric. The inventive hueing agents and compositions naturally build and level off on the fabric at desired amounts to impart a desired whitening effect to the consumer, without creating a dyed (e.g. over-hued) fabric.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. An aqueous laundry care composition comprising:
   (a) a laundry care ingredient;
   (b) from 0.0001 wt % to 1.0 wt % of a polymeric thiophene hueing agent having the structure of Formula III:

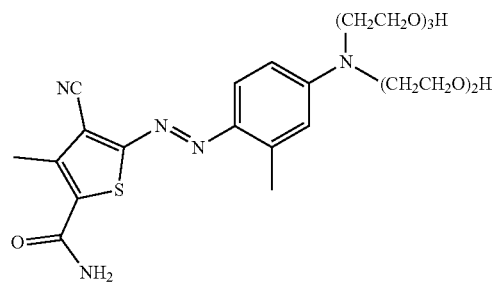

Formula III (c) water in an amount in the range from 25% to 75% based on total laundry care composition weight.

2. The aqueous laundry care composition of claim 1, wherein the composition further comprises at least one of the following structures:

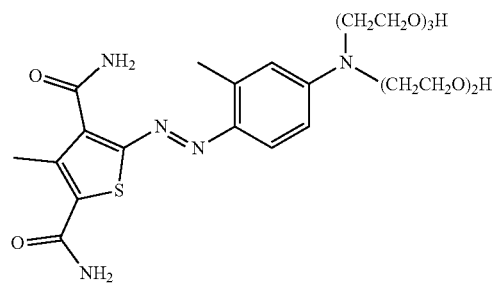

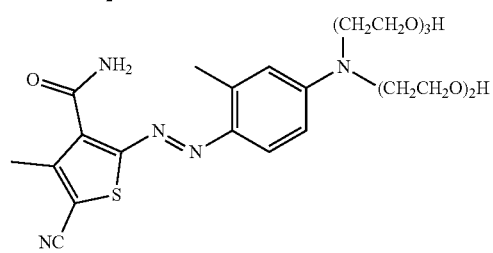

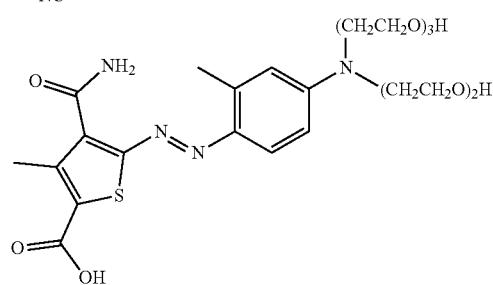

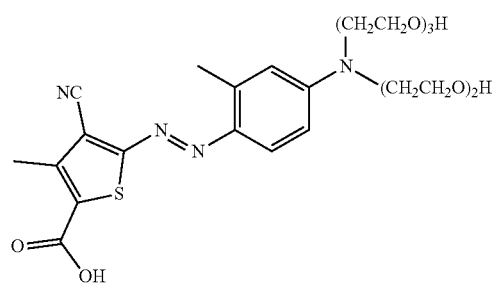

-continued

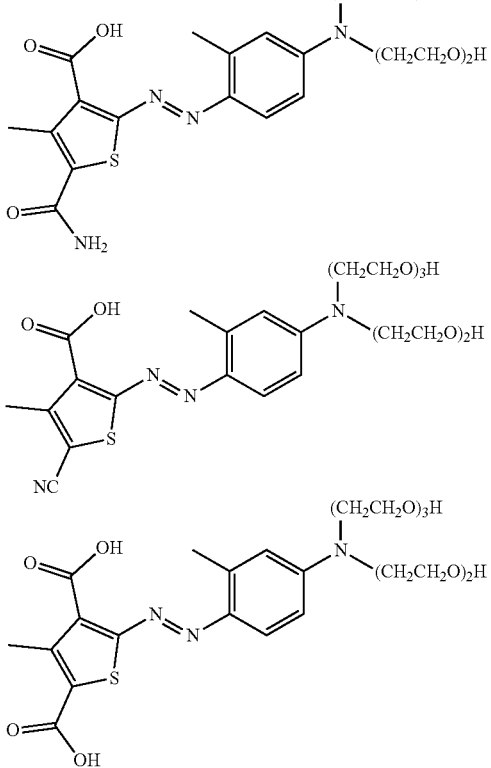

or salts thereof.

3. The aqueous laundry care composition of claim 1, wherein the hueing agent is present in an amount in the range from 1 ppm to 500 ppm.

4. The aqueous laundry care composition of claim 1, wherein the composition is present in unit dose form.

5. The aqueous laundry care composition of claim 1, wherein the composition is present in a multi-compartment unit dose form.

6. The aqueous laundry care composition of claim 1, wherein the laundry care ingredient is selected from the group consisting of cationic polymers, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, pigments, coloring agents, perfumes, perfume delivery systems, structure elasticizing agents, fabric softeners, carriers, hydrotropes, and processing aids.

7. The aqueous laundry care composition of claim 1, wherein the composition imparts a desired hue to a textile article with a relative hue angle >270.

8. The aqueous laundry care composition of claim 1, wherein the composition imparts a desired hue to a textile article with a relative hue angle in the range from 270 to 310.

9. The aqueous laundry care composition of claim 1, wherein the composition imparts a desired hue to a textile article with a relative hue angle in the range from 290 to 310.

10. A method of treating a textile article to improve the visual appearance of the article comprising the steps of (1) providing a textile article, and (2) exposing the textile article to the aqueous laundry care composition of claim 1.

11. The method of claim 10, wherein the textile article is comprised of cellulose-containing fiber.

12. A method of treating a textile article comprising the steps of (i) treating the textile article with the aqueous laundry care composition of claim 1, and (ii) rinsing and drying the treated textile article.

* * * * *

UNITED STATES PATENT AND TRADEMARK OFFICE
CERTIFICATE OF CORRECTION

PATENT NO. : 12,195,703 B2  
APPLICATION NO. : 17/156771  
DATED : January 14, 2025  
INVENTOR(S) : Wesley A. Freund et al.

Page 1 of 1

It is certified that error appears in the above-identified patent and that said Letters Patent is hereby corrected as shown below:

In the Claims

In Column 44, Line 15, Claim 1 insert --and-- before "(c) water in an amount in the range..."

In Column 46, Line 10, Claim 6 delete "and" before "enzyme stabilizers..."

Signed and Sealed this  
Eighteenth Day of February, 2025

Coke Morgan Stewart  
*Acting Director of the United States Patent and Trademark Office*